(12) United States Patent
Filsfils et al.

(10) Patent No.: US 10,778,816 B2
(45) Date of Patent: Sep. 15, 2020

(54) ENHANCED SEGMENT ROUTING PROCESSING OF PACKETS

(71) Applicant: Cisco Technology, Inc., San Jose, CA (US)

(72) Inventors: Clarence Filsfils, Brussels (BE); Francois Clad, Strasbourg (FR); Pablo Camarillo Garvia, Madrid (ES); David Delano Ward, Somerset, WI (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/019,286

(22) Filed: Jun. 26, 2018

(65) Prior Publication Data

US 2018/0375766 A1 Dec. 27, 2018

Related U.S. Application Data

(60) Provisional application No. 62/525,439, filed on Jun. 27, 2017.

(51) Int. Cl.
*H04L 12/741* (2013.01)
*H04L 12/46* (2006.01)
(Continued)

(52) U.S. Cl.
CPC .......... *H04L 69/22* (2013.01); *H04L 12/4633* (2013.01); *H04L 12/4641* (2013.01); *H04L 45/14* (2013.01); *H04L 45/34* (2013.01); *H04L 45/74* (2013.01); *H04L 45/741* (2013.01); *H04L 49/35* (2013.01); *H04L 61/2007* (2013.01);
(Continued)

(58) Field of Classification Search
None
See application file for complete search history.

(56) References Cited

U.S. PATENT DOCUMENTS 9,397,931 B1 7/2016 Mohanty et al.
9,537,769 B2 1/2017 Bryant et al.
(Continued)

OTHER PUBLICATIONS

Filsfls et al., "SRv6 Network Programming," draft-filsfils-spring-srv6-network-programming-04, Mar. 4, 2018, The Internet Society, Reston, VA, USA (fifty-seven pages).

(Continued)

*Primary Examiner* — Saba Tsegaye
(74) *Attorney, Agent, or Firm* — The Law Office of Kirk D. Williams

(57) ABSTRACT

In one embodiment, new Segment Routing capabilities are used in the steering of packets through Segment Routing nodes in a network. A Segment List includes a set of one or more Segment List (SL) Groups, each of which identifies one or more Segments contiguously or non-contiguously stored in the Segment List (or stored across multiple Segment Lists) of a Segment Routing packet. Each SL Group typically includes one Segment that is encoded as a Segment Identifier, and may include Segments that are Extended Values. The steering order of SL Groups is not required to be the same order as they are listed in the Segment List, as the value of Segments Left may be increased, remain the same, or decreased (possibly to skip a next SL Group) and possibly based on the result of an evaluation of a conditional expression.

20 Claims, 11 Drawing Sheets

(51) Int. Cl.
| | |
|---|---|
| *H04L 29/06* | (2006.01) |
| *H04L 29/08* | (2006.01) |
| *H04L 12/721* | (2013.01) |
| *H04L 29/12* | (2006.01) |
| *H04L 12/931* | (2013.01) |
| *H04L 12/749* | (2013.01) |
| *H04L 12/26* | (2006.01) |

(52) U.S. Cl.
CPC ............ *H04L 67/10* (2013.01); *H04L 67/327* (2013.01); *H04L 69/324* (2013.01); *H04L 43/028* (2013.01); *H04L 45/745* (2013.01); *H04L 61/2503* (2013.01); *H04L 61/6059* (2013.01); *H04L 63/0272* (2013.01); *H04L 2212/00* (2013.01)

(56) References Cited

U.S. PATENT DOCUMENTS

| | | | |
|---|---|---|---|
| 9,762,488 | B2 | 9/2017 | Previdi et al. |
| 10,063,475 | B2 | 8/2018 | Previdi et al. |
| 10,382,334 | B2 | 8/2019 | Previdi et al. |
| 10,516,610 | B2 | 12/2019 | Filsfils et al. |
| 2014/0369356 | A1* | 12/2014 | Bryant .................. H04L 45/745 370/392 |
| 2015/0256456 | A1* | 9/2015 | Previdi ................. H04L 45/745 370/392 |
| 2016/0380848 | A1 | 12/2016 | Raney |
| 2017/0026286 | A1* | 1/2017 | Surcouf ................ H04L 45/742 |
| 2017/0237656 | A1* | 8/2017 | Gage ...................... H04L 45/74 370/392 |
| 2018/0034727 | A1* | 2/2018 | Nainar .................... H04L 45/28 |
| 2018/0375764 | A1 | 12/2018 | Filsfils et al. |
| 2018/0375768 | A1 | 12/2018 | Previdi et al. |
| 2018/0375968 | A1 | 12/2018 | Bashandy et al. |
| 2019/0215267 | A1 | 7/2019 | Filsfils et al. |
| 2019/0288940 | A1 | 9/2019 | Filsfils et al. |
| 2019/0394211 | A1 | 12/2019 | Filsfils et al. |

OTHER PUBLICATIONS

Filsfls et al., "Segment Routing Architecture," draft-ietf-spring-segment-routing-15, Jan. 25, 2018, The Internet Society, Reston, VA, USA (thirty-one pages).
Previdi et al., "IPv6 Segment Routing Header (SRH)," draft-ietf-6man-segment-routing-header-10, Mar. 17, 2018, The Internet Society, Reston, VA, USA (thirty-three pages).
Rekhter et al., "A Border Gateway Protocol 4 (BGP-4)," RFC 4271, Jan. 2006, The Internet Society, Reston, VA, USA (104 pages).
Bates et al., "Multiprotocol Extensions for BGP-4," RFC 2283, Feb. 1998, The Internet Society, Reston, VA, USA (nine pages).
Deering et al., "Internet Protocol, Version 6 (IPv6) Specification," RFC 2460, Dec. 1998, The Internet Society, Reston, VA, USA (thirty-nine pages).
S. Deering and R. Hinden, "Internet Protocol, Version 6 (IPv6) Specification," RFC 8200, Jul. 2017, The Internet Society, Reston, VA, USA (forty-two pages).
T. Bates et al., "Multiprotocol Extensions for BGP-4," RFC 4760, Jan. 2007, The Internet Society, Reston, VA, USA (twelve pages).
Rosen et al., "Multiprotocol Label Switching Architecture," RFC 3031, Jan. 2001, The Internet Society, Reston, VA, USA (sixty-one pages).
"Information technology—Telecommunications and information exchange between systems—Intermediate System to Intermediate System intra-domain routeing information exchange protocol for use in conjunction with the protocol for providing the connectionless-mode network service (ISO 8473)," Second Edition, Nov. 15, 2002, ISO/IEC 2002, Switzerland (210 pages).
Previdi et al., "IPv6 Segment Routing Header (SRH)," draft-ietf-6man-segment-routing-header-13, May 23, 2018, The Internet Society, Reston, VA, USA (twenty-one pages).
Seneviratfine and Paridaens, "MPLS Label Stack Authentication methods and algorithms," draft-tsenevir-mpls-lauth-01.txt, Jul. 2001, The Internet Society, Reston, VA, USA (seven pages).
Krawczyk et al., "HMAC: Keyed-Hashing for Message Authentication," RFC 2104, Feb. 1997, The Internet Society, Reston, VA, USA (eleven pages).
Kent and Seo, "Security Architecture for the Internet Protocol," RFC 4301, Dec. 2005, The Internet Society, Reston, VA, USA (101 pages).
S. Kent, "IP Authentication Header," Dec. 2005, RFC 4302, The Internet Society, Reston, VA, USA (thirty-four pages).
S. Kent, "IP Encapsulating Security Payload (ESP)," Dec. 2005, RFC 4303, The Internet Society, Reston, VA, USA (forty-four pages).
PCT International Search Report and Written Opinion, PCT Application PCT/US2018/039739, ISA/EP, European Patent Office, Netherlands, dated Sep. 18, 2018 (eighteen pages).
Previdi et al., "IPv6 Segment Routing Header (SRH)," draft-ietf-6man-segment-routing-header-06, Mar. 13, 2017, The Internet Society, Reston, VA, USA (thirty-five pages).
Filsfls et al., "SRv6 Network Programming," draft-filsfils-spring-srv6-network-programming-00, Mar. 9, 2017, The Internet Society, Reston, VA, USA (forty-one pages).
Abdelsalam et al., "Implementation of Virtual Network Function Chaining through Segment Routing in a Linux-based NFV Infrastructure," arXiv.org, Apr. 20, 2017, XP055505386, DOI: arXiv:1702.05157v4, Cornell University Library, Ithaca, NY (ten pages).
Dawra et al., "BGP Signaling of IPv6-Segment-Routing-based VPN Networks," draft-dawra-idr-srv6-vpn-00.txt, Mar. 13, 2017, The Internet Society, Reston, VA, USA (twelve pages).

\* cited by examiner

ENHANCED SEGMENT ROUTING PROCESSING OF PACKETS

CROSS-REFERENCE TO RELATED APPLICATIONS

This application claims the benefit of U.S. Provisional Application No. 62/525,439, filed Jun. 27, 2017, which is hereby incorporated by reference in its entirety.

TECHNICAL FIELD

The present disclosure relates generally to processing and sending of Internet Protocol (IP) Segment Routing packets in packet network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Packets are typically forwarded in a network based on one or more values representing network nodes or paths.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1A:
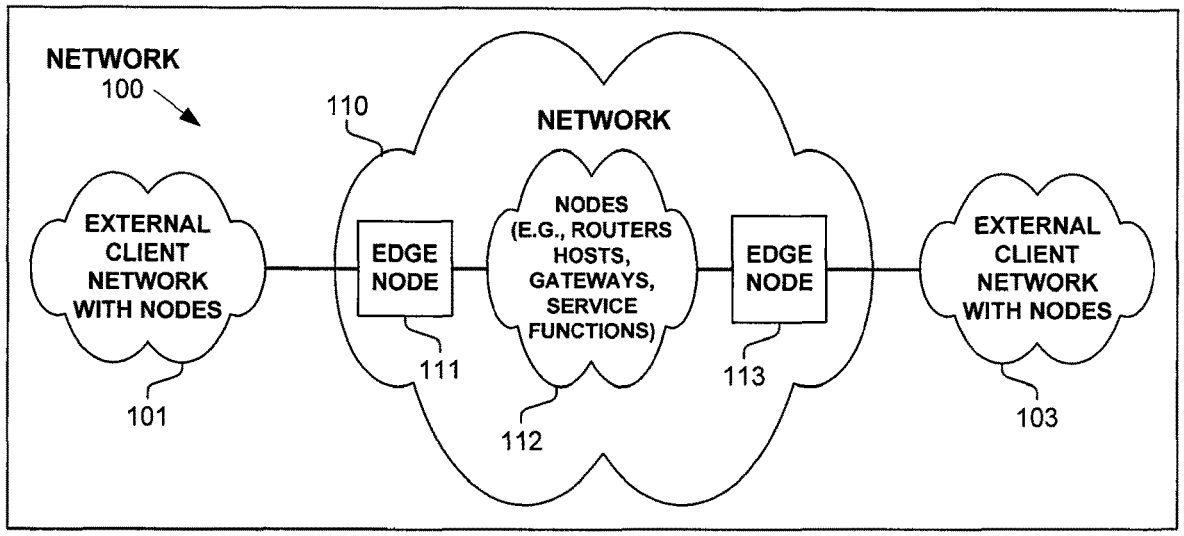
FIG. 1A illustrates a network operating according to one embodiment.

Disclosed are, inter alia, methods, apparatus, computer-storage media, mechanisms, and means associated with enhanced Segment Routing processing of packets.

In one embodiment, a particular Segment Routing packet is received by a first Segment Routing node in a network. The particular Segment Routing packet includes an outer IP header having an Internet Protocol (IP) Destination Address with a value of a first Segment Identifier that is an address of the first Segment Routing node. The particular Segment Routing packet includes a particular Segment Routing Header that includes a Segments Left value and a Segment List. The Segment List comprises a first Segment List Group (SL Group) and a second SL Group including a second Segment Identifier. The Segments Left value identifies a position of the first SL Group in the Segment List. After processing the packet according to a first Segment Routing function identified from the first Segment Identifier, the first Segment Routing forwards the particular Segment Routing packet.

In one embodiment, a particular Segment Routing packet is received by a first Segment Routing node in a network. The particular Segment Routing packet includes an outer IP header having an Internet Protocol (IP) Destination Address with a value of a first Segment Identifier that is an address of the first Segment Routing node. The particular Segment Routing packet includes a particular Segment Routing Header that comprises a Segments Left value and a Segment List. The Segment List comprising a first Segment List Group (SL Group) including the first Segment Identifier, a second SL Group including a second Segment Identifier, and a third SL Group including a third Segment Identifier, and with the Segments Left value identifying a position in the Segment List of the first Segment Identifier in the first SL Group. The first Segment Routing node identifies a first Segment Routing function based on the first Segment Identifier. Particular processing is performed according to the first Segment Routing function, with said particular processing including performing a particular conditional branching operation that selects a next SL Group from multiple selectable SL Groups in the Segment List based on a result of the evaluation of a conditional expression. The multiple selectable SL Groups includes the second SL Group and the third SL Group. The particular Segment Routing packet is sent into the network after updating by the first Segment Routing node in response to said selection of the next SL Group, with said updating resulting in the Segments Left value identifying the position of said selected next SL Group in the Segment List of said sent particular Segment Routing packet and setting the IP Destination Address based on a selected Segment Identifier in the selected next SL Group.

In one embodiment, a next SL Group/Segment Identifier is determined based on the result of the evaluation of a conditional expression. In one embodiment, at least one of the SL Groups includes multiple Segments, such as, but not limited to, a Segment Identifier and one or more Extended Value(s), with an Extended Value storing information (e.g., additional argument(s)) that affects the processing by a corresponding Segment Routing function. In one embodiment, the particular Segment Routing Header includes a particular type-length-value (TLV) that is globally available to Segment Routing functions for communicating information that affects the processing by a Segment Routing function. In one embodiment, the Segments Left value is increased by a Segment Routing function causing the particular Segment Routing packet to be sent according to a Segment Identifier in a SL Group stored at a higher index position. In one embodiment, the Segments Left value is decreased by a value causing the next SL Group (in the standard Segment Routing order) in the Segment List to be skipped. In one embodiment, the updating of the Segments Left value in identifying the next SL Group (and its Segment Identifier) is determined based on the result of the evaluation of a conditional expression.

2. Description

Disclosed are, inter alia, methods, apparatus, computer-storage media, mechanisms, and means associated with enhanced Segment Routing processing of packets. One embodiment uses new capabilities that provide additional functionality and efficiencies in the processing of Segment Routing packets.

In one embodiment, a Segment List includes a set of one or more Segment List (SL) Groups. As used herein, an "SL Group" refers to values encoded as one or more Segments contiguously or non-contiguously stored in a Segment List (or stored across multiple Segment Lists) of a Segment Routing packet. Each SL Group typically, but not always, has exactly one Segment that is encoded as a Segment Identifier.

According to one embodiment, the steering order through SL Groups is not required to be the same order as they are listed in the Segment List. Segment Routing functions process Segment Routing packets according to a Segment Routing Policy that may increase or decrease the Segments Left value, including by an amount to skip an SL Group at the corresponding index position next in the Segment List. In other words, one embodiment uses a different steering order than through a Segment List from index [n] to index [0]. Additionally, one embodiment uses the result of the evaluation of a conditional branching expression during data plane processing of a Segment Routing packet to determine the next SL Group (and its Segment Identifier).

As used herein Segment Routing includes using Internet Protocol version 6 (IPv6) addresses as Segment Identifiers (SIDs); in other words, as used herein, Segment Routing includes IPv6 Segment Routing (SRv6). As used herein, a Segment Routing node refers to a network node (e.g., router, server, appliance) that performs Segment Routing functionality, including, but not limited to, adding, updating, or removing a Segment Routing Header; performing a Segment Routing function identified by a Segment Identifier that is the IP Destination Address of an IP packet or is a Segment Identifier in a Segment Routing Header. Also, as used herein, an IP packet may or may not be a Segment Routing Packet; but a Segment Routing packet is an IP packet.

The term "outer IP header" of a packet refers to the IP header (not an Extension header) used in processing and forwarding of the packet, and does not refer to a header of a packet encapsulated (e.g., in the payload) of the packet. The terms "Destination Address" and "Source Address" respectively refer to the value of the IP Destination and Source Address fields of the outer IP header.

The terms "node" and "network node" are used herein to refer to a router or host. The term "route" is used herein to refer to a fully or partially expanded prefix/route (e.g., 10.0.0.1 or 10.0.*.*), which is different than a "path" through the network which refers to a nexthop (e.g., next router) or complete path (e.g., traverse router A then router B, and so on). Also, the use of the term "prefix" without a qualifier herein refers to a fully or partially expanded prefix. Also, as used herein, "forwarding information" includes, but is not limited to, information describing how to process (e.g., forward, send, manipulate, modify, change, drop, copy, duplicate, receive) corresponding packets. In one embodiment, determining forwarding information is performed via an ingress lookup operation and an egress lookup operation. Also, the term "processing" when referring to processing of a packet process refers to a broad scope of operations performed in response to a packet, such as, but not limited to, forwarding/sending, dropping, manipulating/modifying/changing, receiving, duplicating, creating, applying one or more service or application functions to the packet or to the packet switching device (e.g., updating information), etc. Also, as used herein, the term processing in "parallel" is used in the general sense that at least a portion of two or more operations are performed overlapping in time.

As described herein, embodiments include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., as well as "particular" and "specific" are typically used herein to denote different units (e.g., a first widget or operation, a second widget or operation, a particular widget or operation, a specific widget or operation). The use of these terms herein does not necessarily connote an ordering such as one unit, operation or event occurring or coming before another or another characterization, but rather provides a mechanism to distinguish between elements units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC § 101 machine statutory class.

FIG. 1A illustrates a network 100 (e.g., an aggregation of one or more networks of one or more different entities) operating according to one embodiment. As shown, network 100 includes client networks 101 and 103 (which are the same network in one embodiment) communicatively coupled to Segment Routing (SR) provider network 110. In one embodiment, each of client networks 101 and 103 include hosts (e.g., end nodes) with upper-layer applications that communicate via network 100. In one embodiment, some of the hosts in client network 101 and/or 103 are SR-capable in that they can generate and process Segment Routing packets.

In one embodiment, Segment Routing network 110 (e.g., a provider network) includes Segment Routing edge nodes 111 and 113, and a network 112 of network nodes including SR-capable routers (and possibly some that are not SR-capable in that they do not process a Segment Routing header/complete Segment Identifier), SR gateways, service functions, and hosts (e.g., end nodes). In one embodiment, SR edge nodes 111 and 113 process packets received from networks 101 and 103, which may include encapsulating or otherwise processing these packets into SR packets such as by adding a SR header (and possibly another IP header) to these packets according to a data plane ascertained Segment Routing policy, and subsequently decapsulating or removing a Segment Routing header (and possibly another IP header) and forwarding the native (Segment Routing or IP) packets into network 101 and 103.

In one embodiment and in response to receiving a packet, a Segment Routing edge node 111, 113 and/or a Segment Routing node within network 112 determines a Segment Routing policy (e.g., list of SL Groups that include Segment Identifiers) through and/or to which to forward a Segment Routing packet encapsulating the native packet. These policies can change in response to network conditions, network programming, etc. In one embodiment, the Segment Routing policy specifies to add one or more SR headers, each with one or more SL Groups, resulting in a Segment Routing packet having one or more Segment Routing headers. In one embodiment, a native packet is received without a Segment Routing header (possibly with an IP Destination Address that is a Segment Identifier/IP address of the receiving Segment Routing node), and the Segment Routing node encapsulates the native packet in a Segment Routing packet including one or more added Segment Routing headers, each including one or more SL Groups. In one embodiment, a Segment Routing packet is received with a Segment Routing header, and with Segment Routing node adding one or more Segment Routing headers resulting in a Segment Routing packet including one or more added Segment Routing headers, each including one or more SL Groups. In contrast, and for each of these scenarios, a single Segment Routing header could have been used that includes all of the SL Groups.

Figure 1B:
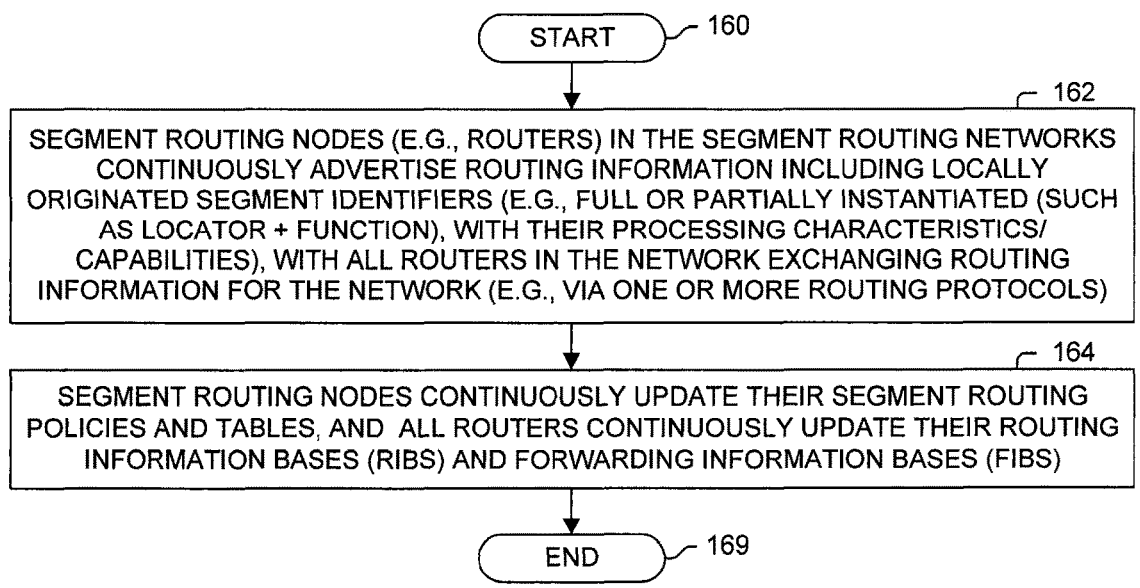
FIG. 1B illustrates a process according to one embodiment.

FIG. 1B illustrates a process according to one embodiment associated with enhanced Segment Routing processing of packets. Processing begins with process block 160. In process block 162, routers in the networks continuously advertise and exchange routing information including Segment Routing information (e.g., routes including Segment Identifiers of network nodes and their corresponding function or function/arguments, attributes of Segment Identifiers, attributes of node) and other routing information (e.g., IPv4 or IPv6 topology information) typically via one or more routing protocols and/or other protocols. In process block 164, Segment Routing and other network nodes continuously update their Segment Routing policies and routing/forwarding information as required (e.g., based on information received via a routing or other protocol, from a network management system, from a path computation engine, etc.). Processing of the flow diagram of FIG. 1B is complete as indicated by process block 169.

Figure 2A:
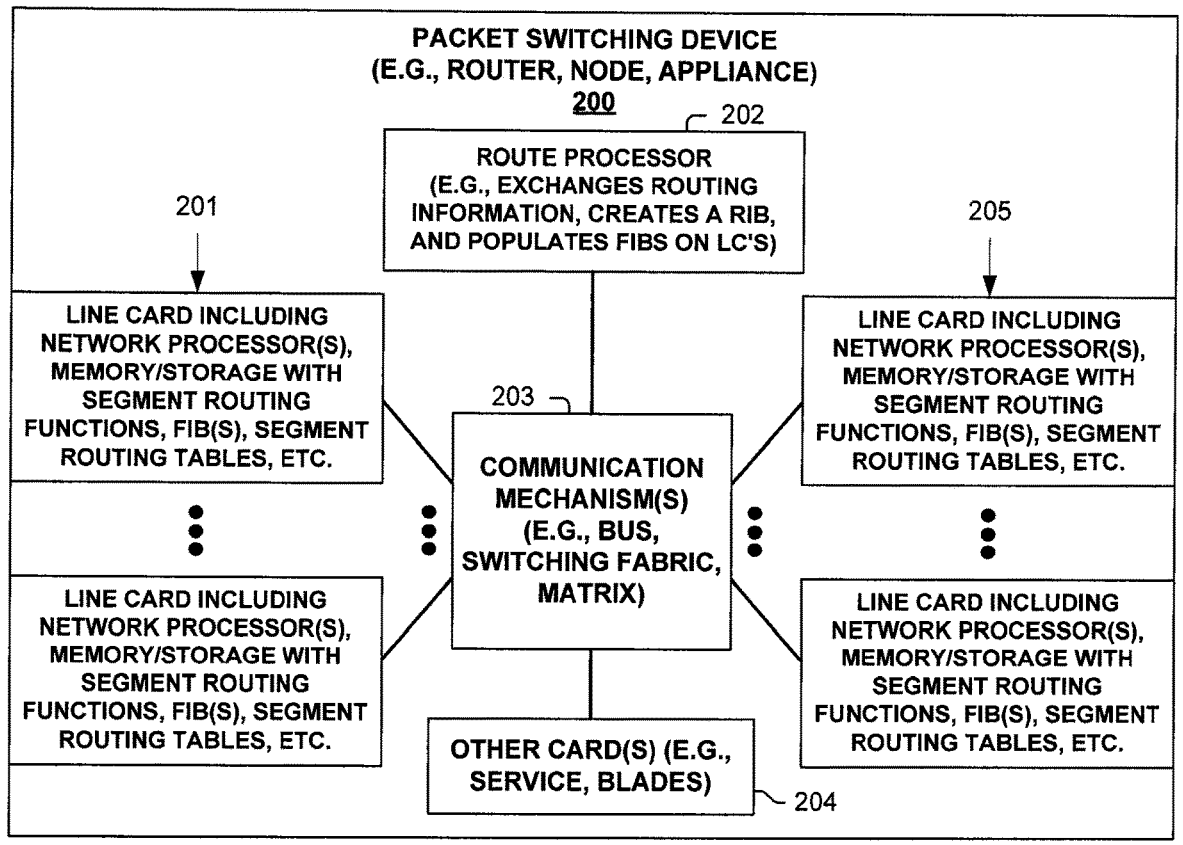
FIG. 2A illustrates a packet switching device according to one embodiment.
Figure 2B:
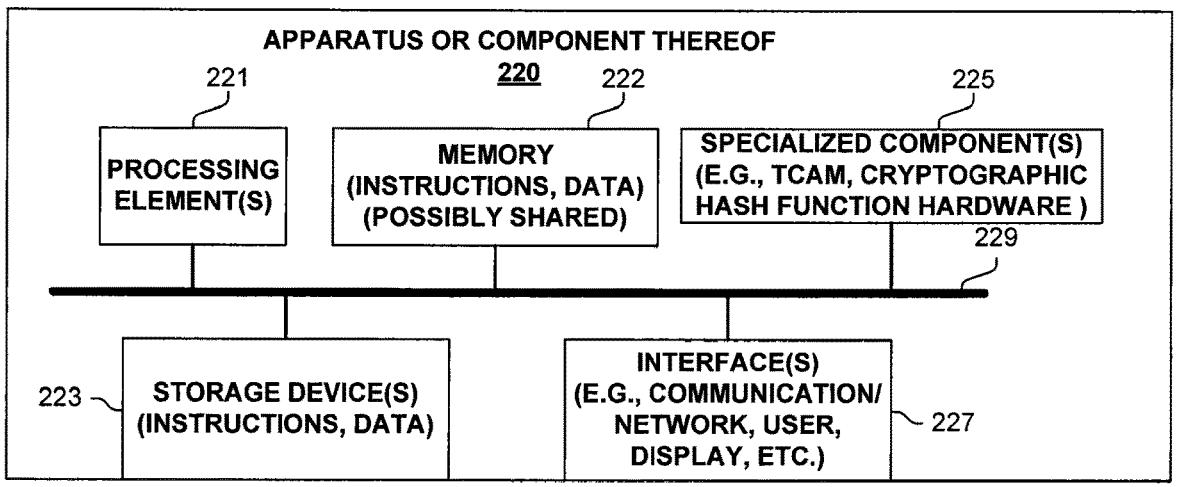
FIG. 2B illustrates an apparatus according to one embodiment.

FIGS. 2A-B and their discussion herein provide a description of various network nodes according to one embodiment.

FIG. 2A illustrates one embodiment of a packet switching device 200 (e.g., router, node, appliance, gateway) according to one embodiment. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with enhanced Segment Routing processing of packets. Packet switching device 200 also has a control plane with one or more processing elements (e.g., Route Processor(s)) 202 for managing the control plane and/or control plane processing of packets associated with enhanced Segment Routing processing of packets. Packet switching device 200 also includes other cards 204 (e.g., service cards, blades) which include processing elements that are used in one embodiment to process (e.g., forward/send, drop, manipulate, change, modify, receive, create, duplicate, perform SR functionality possibly with shared memory with one or more service functions, apply a service according to one or more service functions) packets associated with enhanced Segment Routing processing of packets, and some hardware-based communication mechanism 203 (e.g., bus, switching fabric, and/or matrix, etc.) for allowing its different entities 201, 202, 204 and 205 to communicate. Line cards 201 and 205 typically perform the actions of being both an ingress and egress line card, in regards to multiple other particular packets and/or packet streams being received by, or sent from, packet switching device 200. In one embodiment, Segment Routing functions are implemented on line cards 201, 205.

FIG. 2B is a block diagram of an apparatus 220 (e.g., host, router, node, destination, or portion thereof) used in one embodiment associated with enhanced Segment Routing processing of packets. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222 (possibly shared memory), storage device(s) 223, specialized component(s) 225 (e.g. optimized hardware such as for performing lookup, packet processing (including Segment Routing processing) and/or service function operations; associative memory; binary and/or ternary content-addressable memory; Application Specific Integrated Circuit (s), cryptographic hash hardware, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3A:
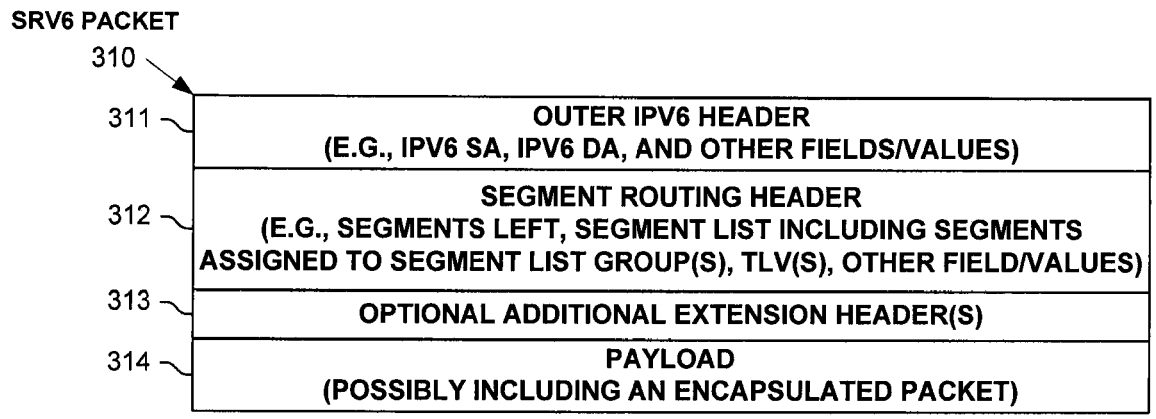
FIG. 3A illustrates a Segment Routing Packet according to one embodiment.

FIG. 3A illustrates a SRv6 packet 310 according to one embodiment. As shown, SRv6 packet 310 includes an outer IPv6 header 311 that includes an IP Source Address and an IP Destination Address (and other values), Segment Routing header 312 (e.g., that includes a Segment List with one or more SL Groups with Segment Identifiers, a Segments Left value, a TLV, group tag and other fields/values); optional additional extension header(s) 313 (each of which may include an additional Segment Routing header); and payload 314 (possibly including an encapsulated original packet).

In one embodiment, a TLV in a Segment Routing Header is used to communicate information to one or more Segment Routing functions and inserted in the packet as part of the Segment Routing Policy being added to the packet. It is preferable in one embodiment to store information to be accessed by multiple Segment Routing functions in a TLV, rather than replicating in each of multiple SL Groups (e.g., in an Extended Value Segment). In one embodiment, a TLV stores user identification required by both a parental control Segment Routing function and by a network access Segment Routing function. In one embodiment, a TLV stores security state.

In one embodiment, a TLV is used in a manner similar to shared memory, wherein a Segment Routing function can share/exchange information with one or more other Segment Routing functions. In one embodiment, a Deep Packet Inspection function of a distributed security appliance adds security information. In one embodiment, a TLV is used to trace the Segment Routing functions applied to the packet.

Figure 3B:
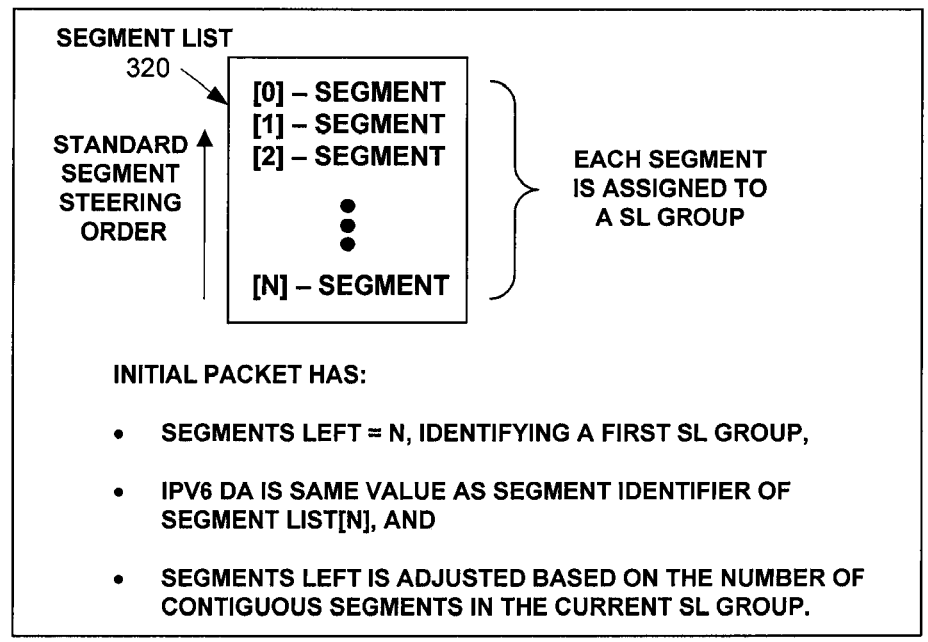
FIG. 3B illustrates a Segment List according to one embodiment.

FIG. 3B illustrates a Segment List 320 according to one embodiment. Segment List 320 includes N+1 Segments, with each of these Segments assigned to an SL Group. In one embodiment, all Segments of an SL Group are stored at contiguous index positions in Segment List 320. In one embodiment, all Segments of an SL Group are not stored at contiguous index positions in Segment List 320. In one embodiment, an initial Segment Routing packet has a Segments Left value of N, identifying a first SL Group. In one embodiment, the Segment Identifier of the first SL Group is located at index position N of Segment List 320, with the IP Destination Address of this Segment Routing packet being the Segment Identifier. In one embodiment, the first SL Group does not include a Segment Identifier as its value is that of the IP Destination Address. In one embodiment with Segments of a SL Group being stored contiguously in Segment List 320, Segments Left is updated based on the number (e.g., one, two or more) of contiguous Segments in the current SL Group.

Figure 3C:
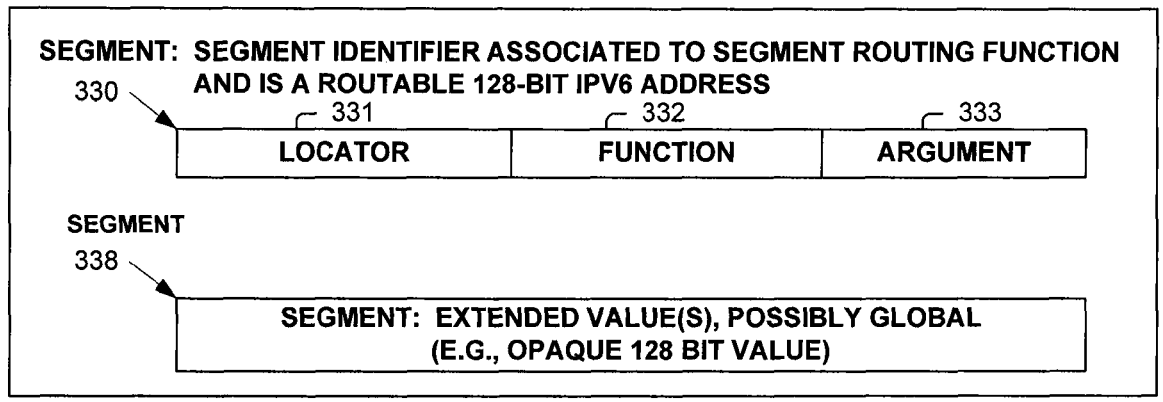
FIG. 3C illustrates a Segment according to one embodiment.

FIG. 3C illustrates a Segment 330 that is a Segment Identifier. As shown, Segment Identifier 330 includes locator 331 that is typically unique to a node; function 332 that identifies a Segment Routing function on that node; and argument 333 (e.g., parameters/data values provided to the Segment Routing function). In one embodiment, the /48, /64, /96 or other portion of Segment Identifier 330 is advertised as an address of a network node, with Segment Identifier 330 also being used as the IP Destination Address of a Segment Routing packet to steer the packet to that node.

FIG. 3C also illustrates a Segment 338 according to one embodiment. Segment 338 typically includes the same number of bits as Segment 330. In one embodiment, Segment 338 is used to increase number of arguments bits available (e.g., it supplements argument 333), with unused bits of Segment 338 being padded. In one embodiment, Segment 338 includes a security/authentication value, a VLAN Identifier, flow identification information, a sequence number, an anti-replay value, a load balancing value, and/or another value used by a Segment Routing function in the processing of a packet.

Figure 3D:
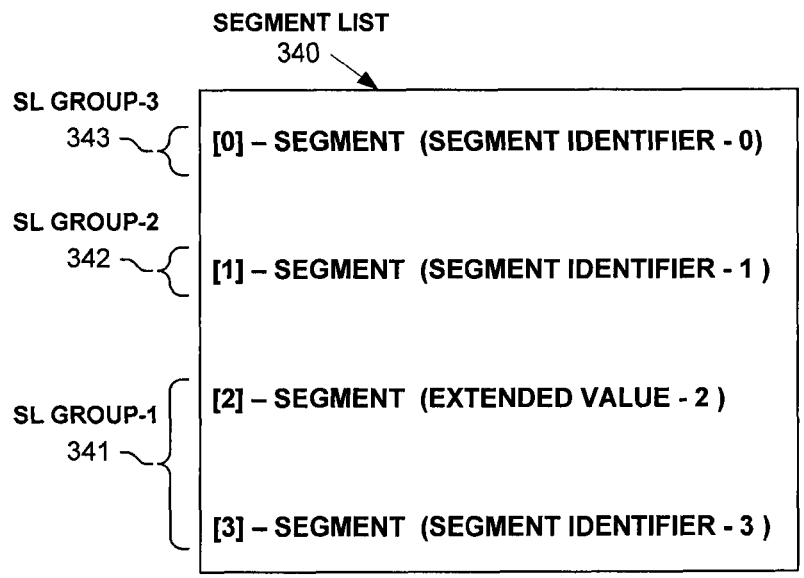
FIG. 3D illustrates a Segment List according to one embodiment.

FIG. 3D illustrates a Segment List 340 according to one embodiment. As shown, Segment List 340 includes three SL Groups 341-343, with Segments correspondingly stored at index positions [3] to [0]. SL Group-1 341 includes the two Segments of Segment Identifier-3 and Extended Value-2. SL Group-2 342 includes the one Segment of Segment Identifier-1. SL Group-3 343 includes the one Segment of Segment Identifier-0.

Figure 3E:
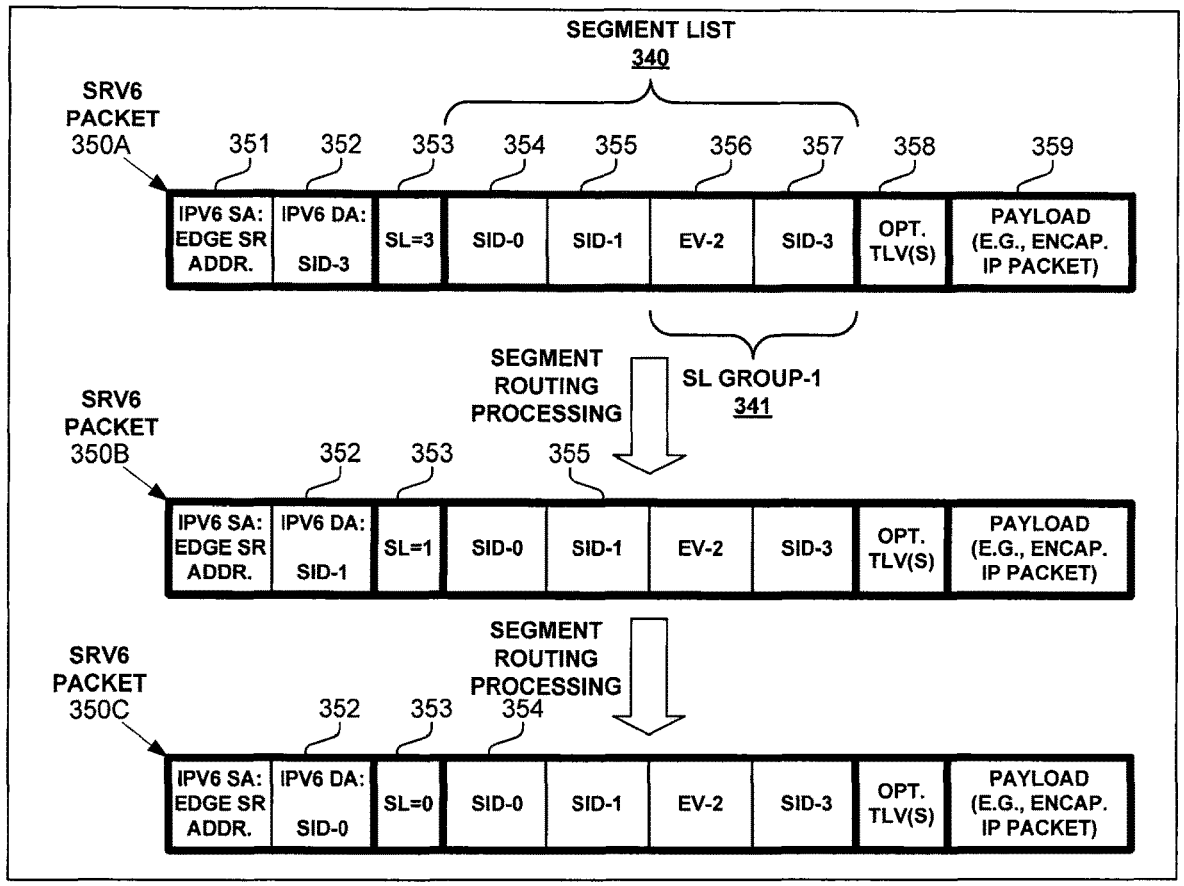
FIG. 3E illustrates processing of a packet according to one embodiment.

FIG. 3E illustrates the updates to the Segment Routing Header of Segment Routing packet (denoted as 350A-C to identify versions of the packet) as it is steered according to its Segment Routing Policy. Segment Routing packet 350A-C includes Segment List 340 (e.g., that shown in FIG. 3D) according to one embodiment.

As shown, SRv6 packet 350A includes an outer IP header including an IP Source Address 351 (e.g., that of a Segment Routing edge router) and an IP Destination Address having a value of SID-3 352 (that is the same value as SID-3 357). SRv6 packet 350 also includes a Segment Routing Header that comprises Segments Left 353 of value three, Segment List 340 including four Segments 354-357, and optionally TLV(s) 358. SRv6 packet 350 also includes payload 359, which typically includes an original IP packet encapsulated therein.

According to one embodiment, Segment Routing packet 350A-C progresses according to the order of the SL Groups 341-343 in Segment List 340. FIG. 3D illustrates SL Groups 341-343 in Segment List 340.

As SL Group-1 341 has two Segments, Segments Left 353 of SRv6 packet 350A is decreased by two. Therefore, Segments Left 353 of SRv6 packet 350B has a value of one, identifying both SL Group-2 342 and its SID-1 355 at position [1] in Segment List 340. IP Destination Address 352 of SRv6 packet 350B is set to the value of SID-1 355.

Next, as SL Group 343 has one Segment, Segments Left 353 of SRv6 packet 350B is decreased by one. Therefore, Segments Left 353 of SRv6 packet 350C has a value of zero that identifies both SL Group-3 343 and its SID-0 354 at position [0] in Segment List 340. IP Destination Address 352 of SRv6 packet 350C is set to the value of SID-0 354.

Figure 3F:
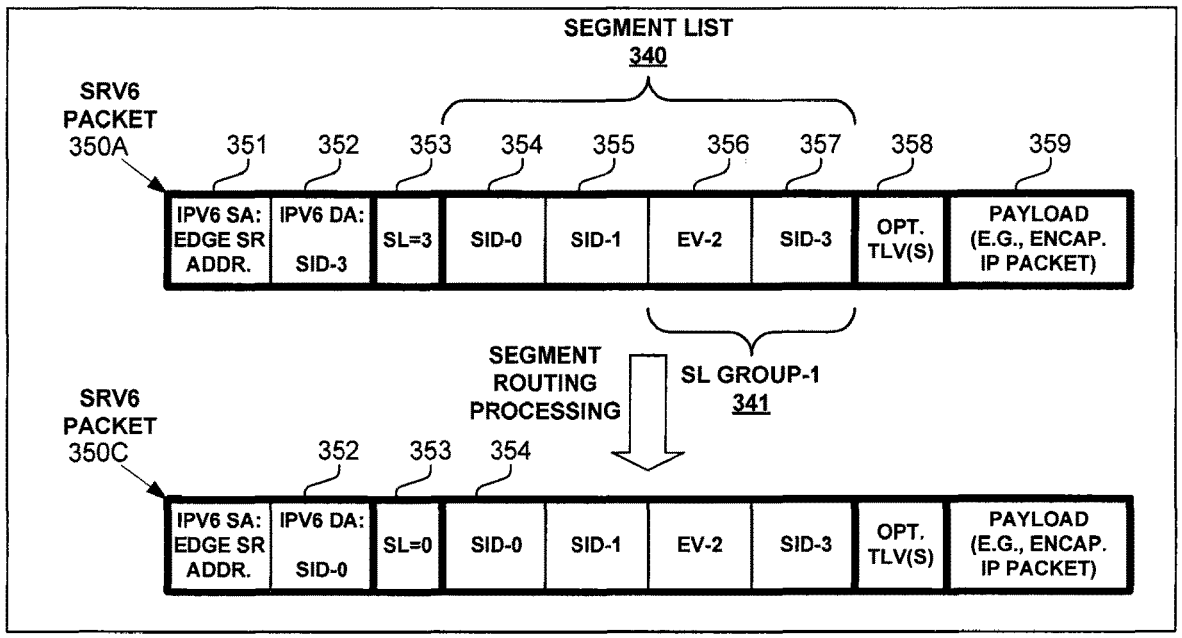
FIG. 3F illustrates processing of a packet according to one embodiment.

FIG. 3F illustrates the progression of a Segment Routing packet 350 (with versions identified by 350A and 350C) according to one embodiment that traverses SL Groups 341-343 according to an order that is different than their order within Segment List 340. In one embodiment, a Segment Routing function updates Segments Left 353 in a manner to cause SL Group 342 (SID-1 355) to be skipped (e.g., SRv6 packet 350A is modified to that of SRv6 packet 350C, and not to that of SRv6 packet 350B as shown in FIG. 3D).

In one embodiment, a Segment Routing function is explicitly programmed to skip Group 342 (and its SID-1 355) by reducing the value of Segments Left 353 in SRv6 packet 350A by the aggregate number of Segments in SL Group-1 341 and SL Group-2 342 (FIG. 3D). Thus, Segments Left 353 is reduced by three resulting in a Segments Left 353 in SRv6 packet 350C having a value of zero, that identifies both SL Group-3 343 and its SID-0 354 at position [0] in Segment List 340. IP Destination Address 352 of SRv6 packet 350C is set to the value of SID-0 354.

In one embodiment, the Segment Routing function that processes SRv6 packet 350A is programmed to perform conditional branching based on the evaluation of a conditional expression (e.g., any conditional expression but typically is based on some value in the Segment Routing Header of the packet). In one embodiment, the conditional branching operation is effectively an if-then operation. In one embodiment, if the result of the evaluation of the conditional expression is TRUE, then the Segment Routing function updates packet 350A to become packet 350B as shown in FIG. 3E. In one embodiment, if the result of the evaluation of the conditional expression is FALSE, then the Segment Routing function updates packet 350A to become packet 350C as shown in FIG. 3F.

Figure 4A:
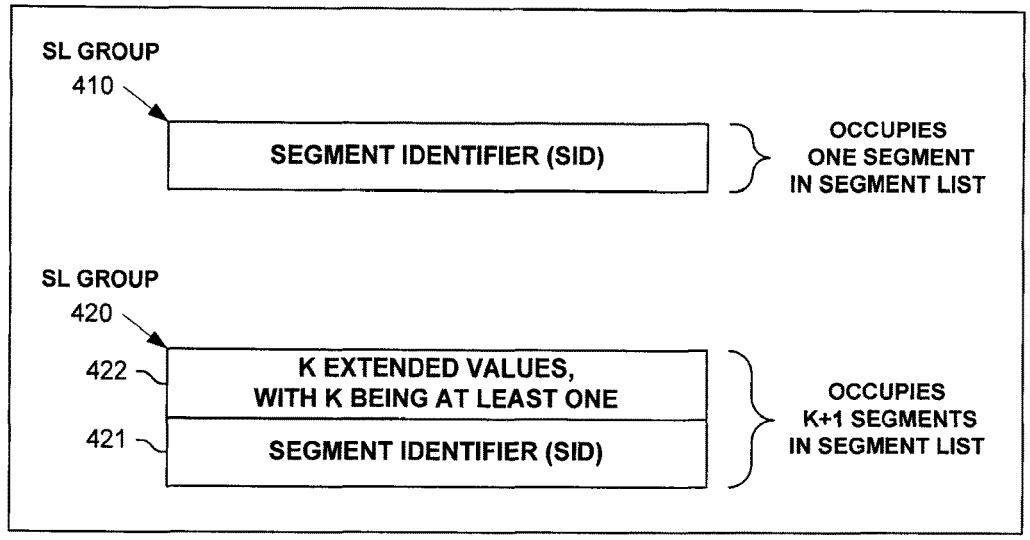
FIG. 4A illustrates a Segment Group according to one embodiment.

FIG. 4A illustrates a Segment Group 410 and a Segment Group 420 according to one embodiment. As shown, SL Group 410 has a Segment Identifier that occupies one Segment in a Segment List. As shown, SL Group 420 has a Segment Identifier that occupies one Segment 421 in a Segment List and also K Extended Values that occupy K Segment(s) 422, with K being one or more. (SL Group 410 effectively has a K value of zero.) Thus, SL Group 420 occupies K+1 Segments in the Segment List.

Figure 4B:
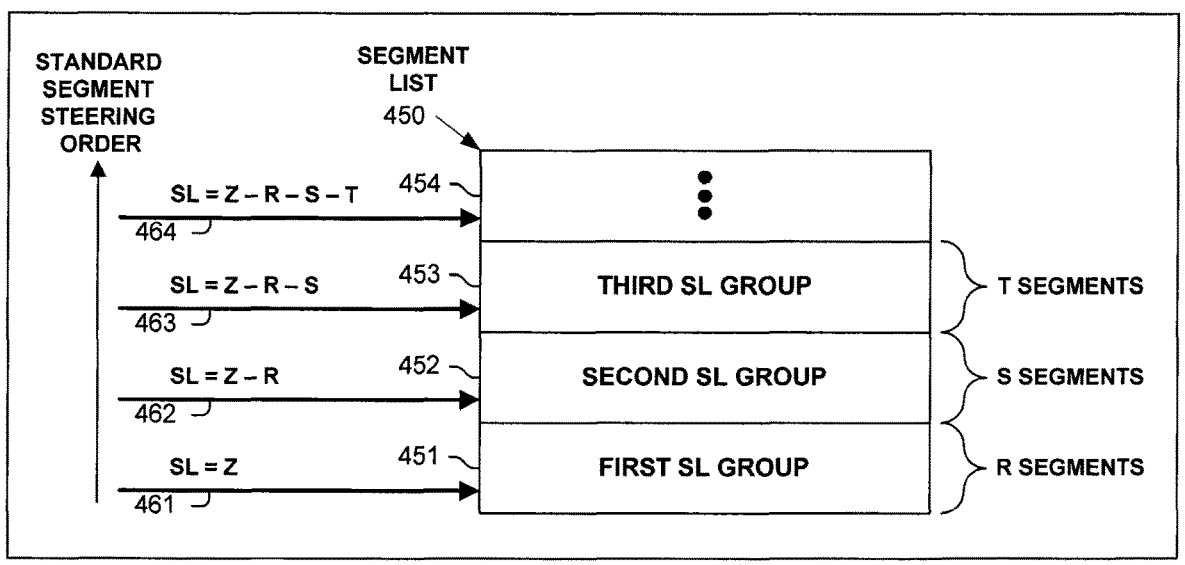
FIG. 4B illustrates a Segment List according to one embodiment.

FIG. 4B illustrates Segment List 450 according to one embodiment. As shown, Segment List 450 includes:
- at index Z (461) first SL Group 451 occupying R Segments;
- at index Z-R (462) second SL Group 452 occupying S Segments; and
- at index Z-R-S (463) third SL Group 453 occupying T Segments;

with the next Segment (not shown) at index Z-R-S-T (454). In one embodiment, each of SL Groups 451-453 has exactly one Segment Identifier that is located in the Segment having the highest index within the respective SL Group (451-453). A Segment Routing Policy associated with each Segment Routing function processing an SRv6 packet including Segment List 450 adjusts the value of Segments Left based on the number of Segments occupied by one or more relevant SL Groups (451-453). In one embodiment, the value of Segments Left, and hence the next SL Group/Segment Identifier (451-453), is updated according to an explicit or conditional branching operation.

Figure 4C:
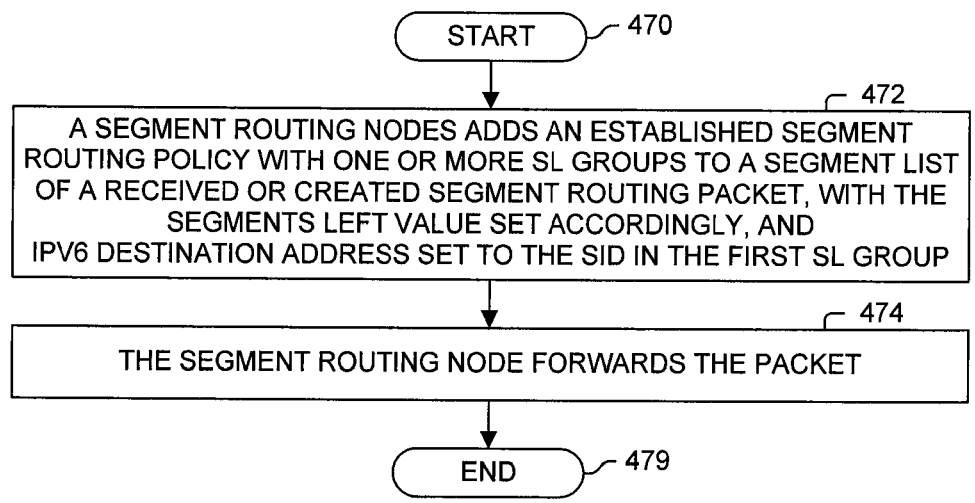
FIG. 4C illustrates a process according to one embodiment.

FIG. 4C illustrates a process according to one embodiment. Processing begins with process block 470. In process block 472, a Segment Routing nodes adds an established Segment Routing Policy with one or more SL Groups to a Segment List of a received or created Segment Routing packet, with the value of Segments Left set accordingly, and having an IPv6 Destination Address set to the Segment Identifier of the first SL Group. In process block 474, the Segment Routing node forwards the Segment Routing packet. Processing of the flow diagram of FIG. 4C is complete as indicated by process block 479.

Figure 5A:
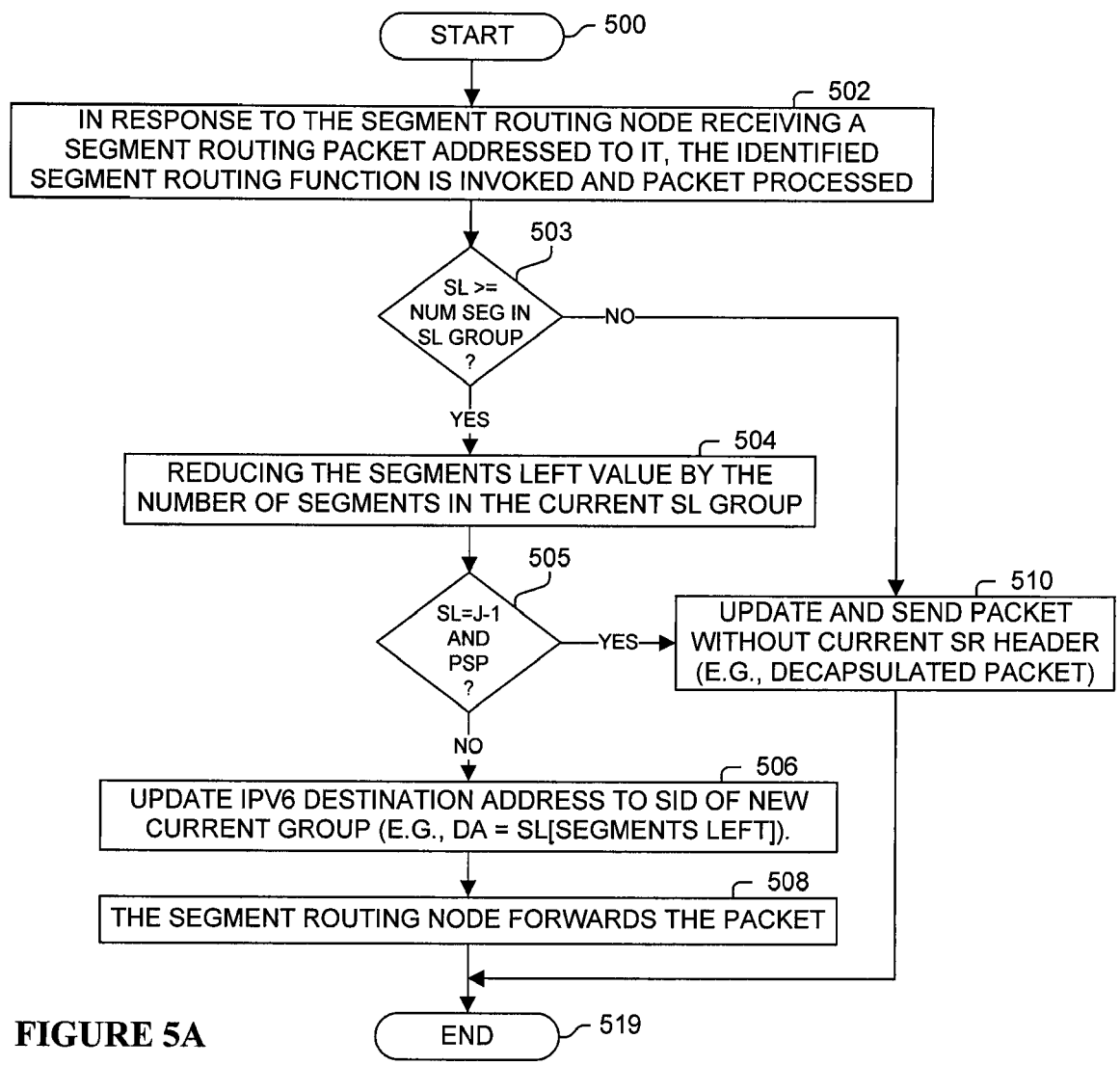
FIG. 5A illustrates a process according to one embodiment.

FIG. 5A illustrates a process according to one embodiment wherein the Segment List is traversed in order from the largest index value to an index value of zero. Processing begins with process block 500. In process block 502, in response to a Segment Routing node receiving a Segment Routing packet addressed to it, the Segment Routing function (identified by a Segment Identifier with a value of the IP Destination Address) is invoked and the packet is accordingly processed (e.g., by an network application). As determined in process block 503, if Segments Lefts is greater than or equal to the number of Segments in the current SL Group, then processing proceeds to process block 504; else processing proceeds to process block 510.

Continuing with process block 504, Segments Left is reduced by the number of Segments in the current SL Group. As determined in process block 505, if the resulting value of Segments Left is J-1 (where J is the number of Segments in the SL Group that includes a Segment at index zero of the Segment List) and penultimate segment popping is enabled, then processing proceeds to process block 510; else processing proceeds to process block 506.

Continuing with process block 506, the IP Destination Address is set to the Segment Identifier of the new current SL Group identified by the updated value of Segments Left. In one embodiment, the IP Destination Address is set to the value of the Segment in the Segment List at the index position of the updated value of Segments Left. In process block 508, the Segment Routing node forwards the Segment Routing packet. Processing of the flow diagram of FIG. 5A is complete as indicated by process block 519.

Continuing with process block 510, the packet is updated to remove the current SR Header resulting in either a Segment Routing packet with a new current Segment Routing Header or without a Segment Routing Header with the IP Destination Address being a Segment Identifier, or decapsulating the original packet from the payload of the Segment Routing packet. Processing of the flow diagram of FIG. 5A is complete as indicated by process block 519.

Figure 5B:
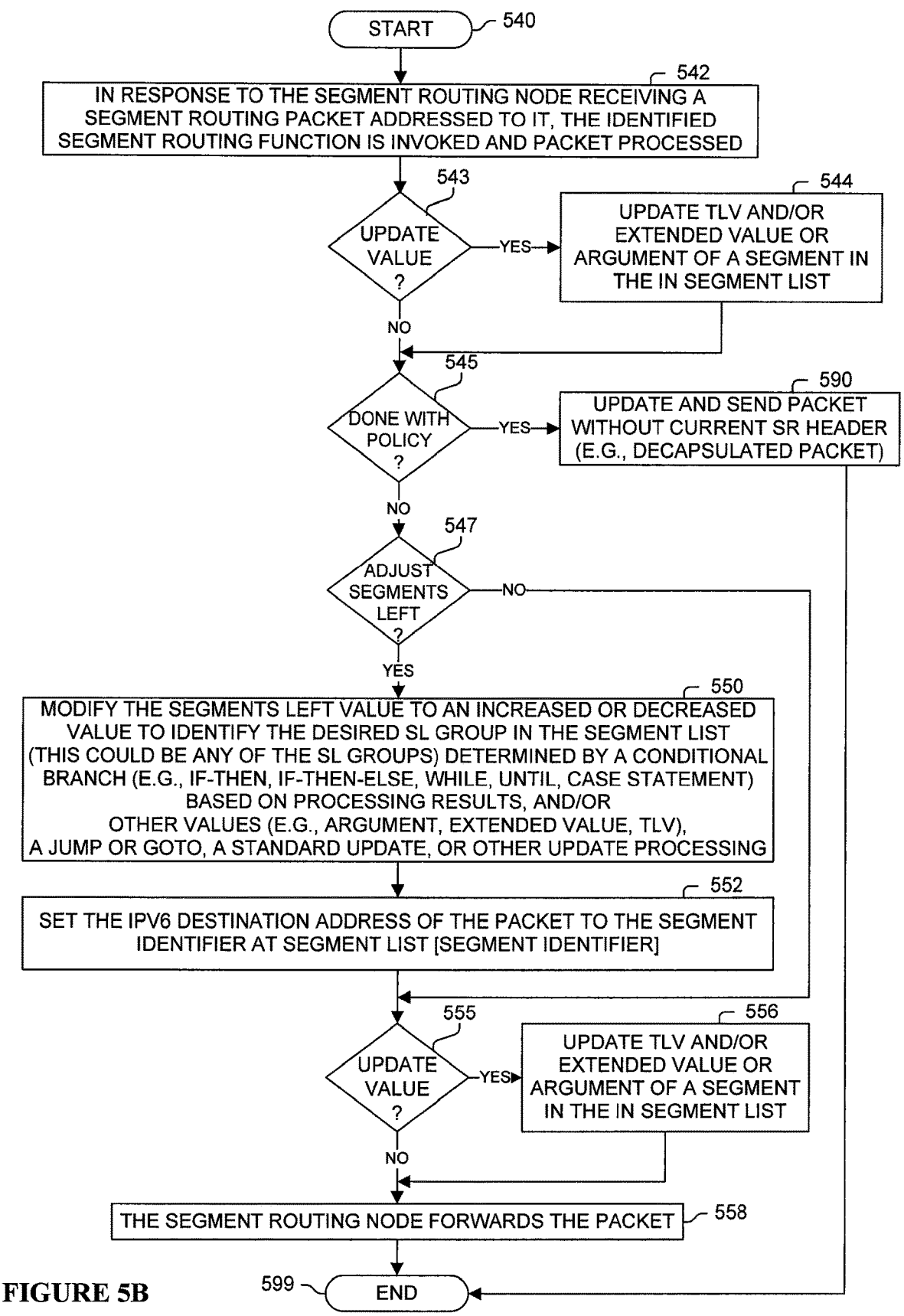
FIG. 5B illustrates a process according to one embodiment.

FIG. 5B illustrates a process according to one embodiment wherein the Segment List is traversed in any order. Processing begins with process block 540. In process block 542, in response to a Segment Routing node receiving a Segment Routing packet addressed to it, the Segment Routing function (identified by a Segment Identifier with a value of the IP Destination Address) is invoked and the packet is accordingly processed (e.g., by an network application).

As determined in process block 543, if a value associated with the packet is to be updated, then processing proceeds to process block 544; else processing proceeds directly to process block 545.

Continuing with process block 544, a value associated with the packet is updated (e.g., a TLV in the Segment Routing Header, an Extended Value, and argument of a Segment Identifier). In one embodiment, the value is a loop count. In one embodiment, the value is a result of the processing of the packet in process block 542. Processing proceeds to process block 545.

As determined in process block 545, if the processing of the packet according to the Segment Routing Policy is complete, processing proceeds to process block 590; else processing proceeds to process block 547. As the order of processing SL Groups in the current Segment List is not restricted in one embodiment, this determination is based on the Segment Routing Policy applied to the packet, possibly dependent on the result of the evaluation of a conditional expression associated with conditional branching.

Continuing with process block 590, the packet is updated to remove the current SR Header resulting in either a Segment Routing packet with a new current Segment Routing Header or decapsulating the original packet from the payload of the Segment Routing packet. Processing of the flow diagram of FIG. 5B is complete as indicated by process block 599.

As determined in process block 547, if the value of Segments Left is to be updated, then processing proceeds to process block 550; else processing proceeds directly to process block 555. In one embodiment, Segments Left is not updated so that the Segment Routing node forwards the packet back to itself.

In process block 550, the value of Segments Left is modified to an increased or decreased value to identify a selected next SL Group (and the selected next Segment Identifier therein) in the Segment List from the selectable next SL Groups (hence next selectable Segment Identifiers). In one embodiment, the selectable next SL Groups are all of the SL Groups in the Segment List. In one embodiment, the selectable next SL Groups are the SL Groups in the Segment List at an index position less than the current value of Segments Left.

In one embodiment, the next SL Group (and hence next Segment Identifier) is determined based on the result of an evaluation of a conditional expression (e.g., corresponding to an IF-THEN, IF-THEN-ELSE, While, Until, Case Statement) using processing results and/or other values (e.g., extracted from the argument, Extended Value, TLV), or from an express jump operation, a standard updating of the Segments Left, or other update processing.

In process block 552, the IP Destination Address is set to the Segment Identifier of the new current (selected next) SL Group identified by the updated value of Segments Left. In one embodiment, the IP Destination Address is set to the value of the Segment in the Segment List at the index position of the updated value of Segments Left. Processing proceeds to process block 555.

As determined in process block 555, if a value associated with the packet is to be updated, then processing proceeds to process block 556; else processing proceeds directly to process block 558.

Continuing with process block 556, a value associated with the packet is updated (e.g., a TLV in the Segment Routing Header, an Extended Value, and argument of a Segment Identifier). Processing proceeds to process block 558.

Continuing with process block 558, the Segment Routing node forwards the Segment Routing packet.

In one embodiment, each SL Group has exactly one Segment. In one embodiment, the absolute value of the Segments Left value of said sent particular Segment Routing packet minus the Segments Left value of said received particular Segment Routing packet is at least two.

Processing of the flow diagram of FIG. 5B is complete as indicated by process block 599.

Figure 6A:
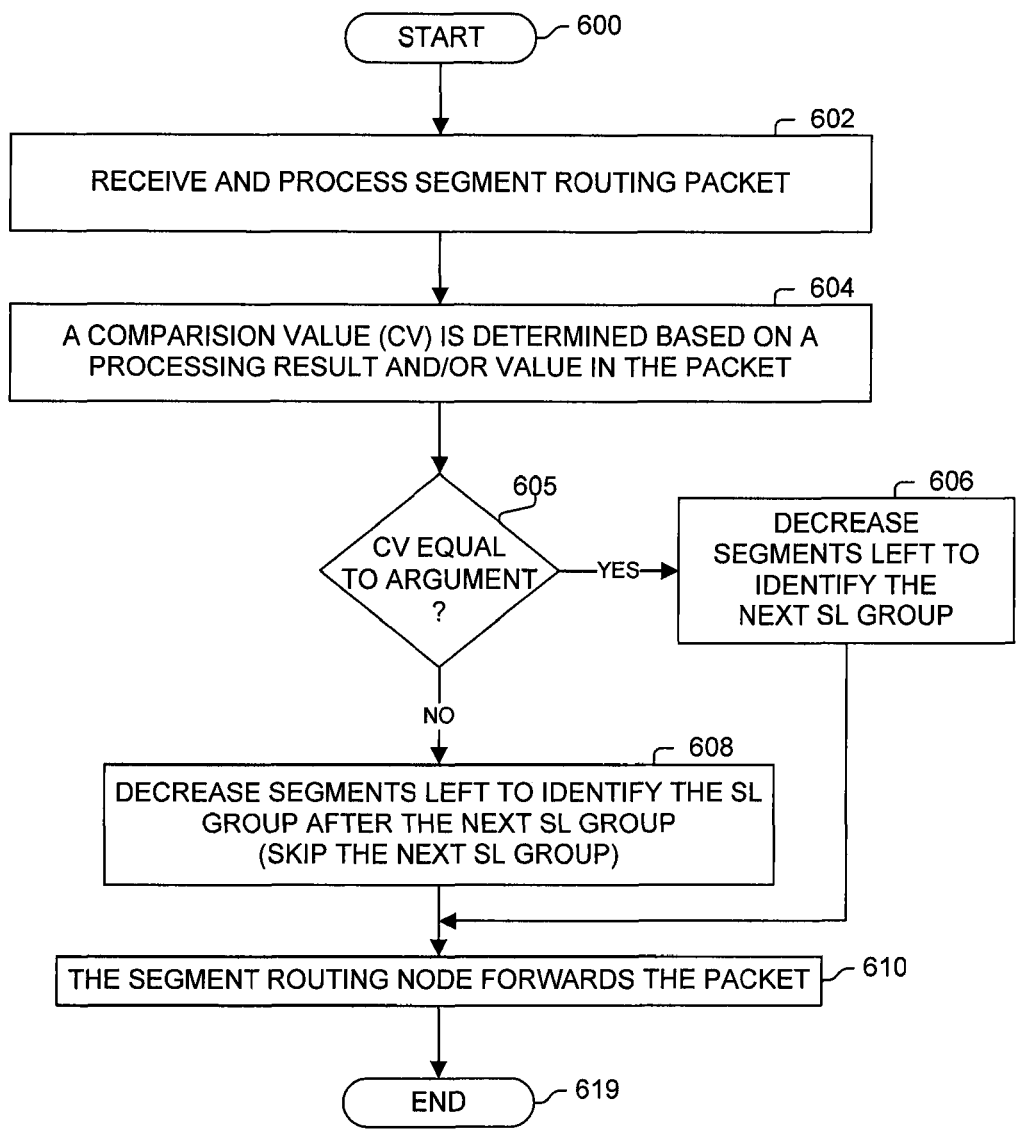
FIG. 6A illustrates a process according to one embodiment.

FIG. 6A illustrates a process according to one embodiment performing conditional branching according to an IF-THEN operation. Processing begins with process block 600. In process block 602, a Segment Routing packet is received and processed (e.g., a service is applied to the packet). In process block 604, a comparison value (CV) is determined based on a processing result and/or value in the packet.

As determined in process block 605, if the comparison value is equal to an argument of the packet (e.g., in the Segment Identifier and/or Extended Value of the current SL Group), then processing proceeds to process block 606; else processing proceeds to process block 608.

Continuing with process block 606, the value of Segments Left is decreased to identify the next SL Group in the Segment List (e.g., the SL Group immediately after the current SL Group). Processing proceeds to process block 610.

Continuing with process block 608, the value of Segments Left is decreased to skip the next SL Group in the Segment List and identify the following SL Group. Processing proceeds to process block 610.

Continuing with process block 610, the Segment Routing node forwards the Segment Routing packet. Processing of the flow diagram of FIG. 6A is complete as indicated by process block 619.

Figure 6B:
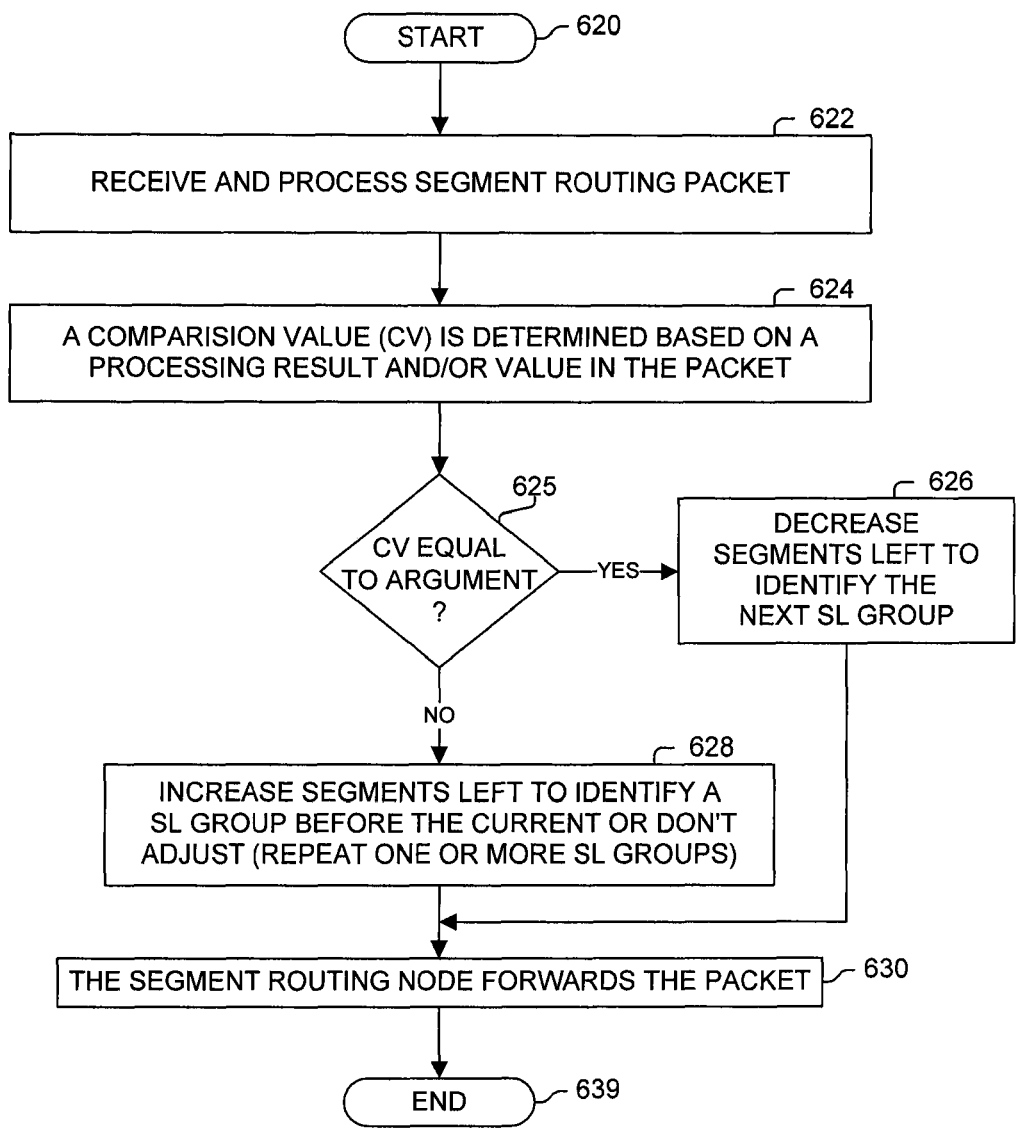
FIG. 6B illustrates a process according to one embodiment.

FIG. 6B illustrates a process according to one embodiment performing conditional branching according to an IF-THEN operation. Processing begins with process block 620. In process block 622, a Segment Routing packet is received and processed (e.g., a service is applied to the packet). In process block 624, a comparison value (CV) is determined based on a processing result and/or value in the packet.

As determined in process block 625, if the comparison value is equal to an argument of the packet (e.g., in the Segment Identifier and/or Extended Value of the current SL Group), then processing proceeds to process block 626; else processing proceeds to process block 628.

Continuing with process block 626, the value of Segments Left is decreased to identify the next SL Group in the Segment List (e.g., the SL Group immediately after the current SL Group). Processing proceeds to process block 630.

Continuing with process block 628, the value of Segments Left is increased to identify a next SL Group (that includes the next Segment Identifier) at an index position before the current SL Group in the Segment List. Alternatively, one embodiment does not modify Segments Left. Processing proceeds to process block 630.

Continuing with process block 630, the Segment Routing node forwards the Segment Routing packet. Processing of the flow diagram of FIG. 6B is complete as indicated by process block 639.

Figure 6C:
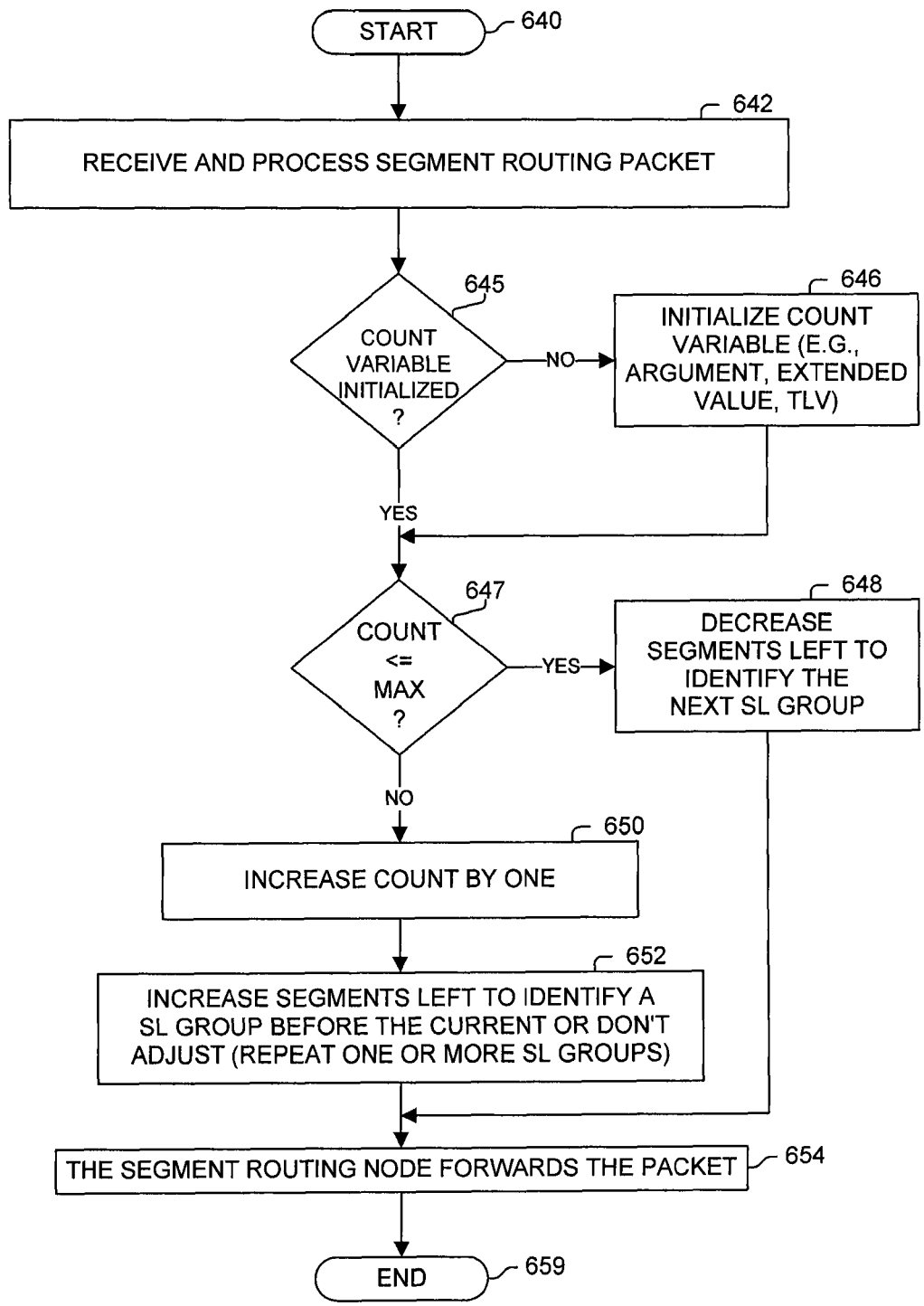
FIG. 6C illustrates a process according to one embodiment.

FIG. 6C illustrates a process according to one embodiment performing conditional branching according to a While or For loop based on the value of a count variable stored in the Segment Routing Header of the packet. Processing begins with process block 640. In process block 642, a Segment Routing packet is received and processed (e.g., a service is applied to the packet).

As determined in process block 645 if the count variable has already been initialized, then processing proceeds directly to process block 647; otherwise processing proceeds to process block 646.

Continuing with process block 646, the count variable in the packet (e.g., in an argument, Extended Value, TLV) is initialized. In one embodiment, the Segment Routing Policy previously added to the packet has already initialized the count variable.

Continuing with and as determined in process block 647, if the count variable is less than or equal to the maximum value, then processing proceeds to process block 648; otherwise processing proceeds to process block 650.

Continuing in process block 648, the value of Segments Left is decreased to identify the next SL Group (and its Segment Identifier). Processing proceeds to process block 654.

Continuing with process block 650, the value of the count variable in the packet is increased by one. In process block 652, the value of Segments Left is increased to identify a next SL Group (including the next Segment Identifier) at an index position before the current SL Group. Alternatively, one embodiment does not modify Segments Left. Processing proceeds to process block 654.

Continuing with process block 654, the Segment Routing node forwards the Segment Routing packet. Processing of the flow diagram of FIG. 6C is complete as indicated by process block 659.

In one embodiment, a Segment Routing function performs a conditional branching operation according to a LookNext(K, F1, F2) function. In one embodiment, the next K Segments are concatenated into a single entry, on which a lookup operation is performed in a specific FIB table. If there is a match, the function F1 is executed; else the function F2 (branching logic) is executed. F1 and F2 may involve skipping any number of Segments, incrementing the Segments Left value to go backward in the Segment List (e.g., a jump or GOTO operation), and reading or writing data in a TLV in the Segment Routing Header.

In one embodiment, a Segment Routing function performs a conditional branching operation according to LookEnd(K, F1, F2) function. In one embodiment, the K Segments at the end of the Segment List are concatenated into a single entry, on which a lookup operation is performed in a specific FIB table. If there is a match, the function F1 is executed; else the function F2 is executed. F1 and F2 may involve skipping any number of next Segments, incrementing the Segments Left value to go backward in the Segment List (e.g., a jump or GOTO operation), and reading or writing data in a TLV in the Segment Routing Header.

In one embodiment, a Segment Routing function performs a conditional branching operation according to LookOffset(O, K, F1, F2) function. In one embodiment, the K Segments in the Segments List at the Offset from the active Segment Identifier are concatenated into a single entry, on which a lookup operation is performed in a specific FIB table. If there is a match, the function F1 is executed; else the function F2 is executed. F1 and F2 may involve skipping any number of next Segments, incrementing the Segments Left value to go backward in the Segment List (e.g., a jump or GOTO operation), and reading or writing data in a TLV in the Segment Routing Header.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:

receiving a particular Segment Routing packet by a first Segment Routing node in a network, with the particular Segment Routing packet including an outer IP header having an Internet Protocol (IP) Destination Address with a value of a first Segment Identifier that is an address of the first Segment Routing node, the particular Segment Routing packet including a particular Segment Routing Header that includes a Segments Left value and a Segment List, with the Segment List comprising a first Segment List Group (SL Group) and a second SL Group including a second Segment Identifier, with the first SL Group including a first plurality of Segments, and with the Segments Left value identifying a position of the first SL Group in the Segment List;

identifying, by the first Segment Routing node, a first Segment Routing function based on the first Segment Identifier; and after processing according to the first Segment Routing function the particular Segment Routing packet based on the first plurality of Segments, the first Segment Routing forwards the particular Segment Routing packet.

2. The method of claim 1, wherein the first plurality of Segments includes the first Segment Identifier and a first Extended Value; and wherein said processing according to the first Segment Routing function is affected by a value in the first Extended value.

3. The method of claim 2, wherein prior to said forwarding the particular Segment Routing packet the first Segment Routing node: decreases the Segments Left value in the particular Segment Routing packet by the number of Segments in the first plurality of Segments resulting in the Segments Left value identifying the second SL Group, and sets the IP Destination Address to the value of the second Segment Identifier.

4. The method of claim 3, wherein said decreasing the Segments Left value is performed in response to a result of a particular conditional branching evaluation based on a value in the Segment Routing Header, with the result of a particular conditional branching evaluation selecting among a plurality of different adjustments to make to the Segments Left value.

5. The method of claim 4, wherein said particular conditional branching evaluation is based on a value in the first Extended Value.

6. The method of claim 4, wherein the particular Segment Routing Header includes a particular type-length-value (TLV); and wherein said processing according to the first Segment Routing function is affected by a value in the particular TLV.

7. The method of claim 2, wherein the Segments List includes in order the first SL Group, the second SL Group, and the third SL group; and
wherein prior to said forwarding the particular Segment Routing packet the first Segment Routing node: decreases the Segments Left value in the particular Segment Routing packet by the number of Segments in the first plurality of Segments and in the second SL Group resulting in the Segments Left value identifying a third SL Group including a third Segment Identifier to skip the second SL Group, and sets the IP Destination Address to the value of the third Segment Identifier.

8. The method of claim 7, wherein said decreasing the Segments Left value is performed in response to a result of a particular conditional branching evaluation based on a value in the Segment Routing Header, with the result of a particular conditional branching evaluation selecting among a plurality of different adjustments to make to the Segments Left value, with the plurality of different adjustments including to identify or skip the second SL Group.

9. The method of claim 1, comprising:
receiving, by a second Segment Routing node in the network, the particular Segment Routing packet subsequent to said forwarding by the first Segment Routing node; and
after processing the particular Segment Routing packet, the second Segment Routing node sending into the network the particular Segment Routing packet with the IP Destination Address having a value of the first Segment Identifier and with the Segments Left value identifying the first SL Group in the Segment List.

10. The method of claim 9, wherein said processing the particular Segment Routing packet by the second Segment Routing node includes: in response to a result of a particular conditional branching evaluation based on a value in the Segment Routing Header, the second Segment Routing node updating the Segments Left value to identify the first SL Group in the Segment List and setting the IP Destination Address to the first Segment Identifier.

11. The method of claim 9, wherein the second Segment Identifier is an address of the second Segment Routing node; and
wherein prior to said forwarding the particular Segment Routing packet the first Segment Routing node: decreases the Segments Left value in the particular Segment Routing packet by the number of Segments in the first plurality of Segments resulting in the Segments Left value identifying the second SL Group, and sets the IP Destination Address to the value of the second Segment Identifier.

12. The method of claim 1, wherein the particular Segment Routing Header includes a particular type-length-value (TLV); and wherein said processing according to the first Segment Routing function is affected by a value in the particular TLV.

13. A method, comprising:
receiving a particular Segment Routing packet by a first Segment Routing node in a network, with the particular Segment Routing packet including an outer IP header having an Internet Protocol (IP) Destination Address with a value of a first Segment Identifier that is an address of the first Segment Routing node, the particular Segment Routing packet including a particular Segment Routing Header that includes a Segments Left value and a Segment List, with the Segment List comprising a first Segment List Group (SL Group) including the first Segment Identifier, a second SL Group including a second Segment Identifier, and a third SL Group including a third Segment Identifier, and with the Segments Left value identifying a position in the Segment List of the first Segment Identifier in the first SL Group;
identifying, by the first Segment Routing node, a first Segment Routing function based on the first Segment Identifier;
performing particular processing according to the first Segment Routing function, with said particular processing including performing a particular conditional branching operation that selects a next SL Group from a plurality of selectable next SL Groups in the Segment List based on a result of the evaluation of a conditional expression, with the plurality of selectable next SL Groups including the second SL Group and the third SL Group; and
sending into the network the particular Segment Routing packet after updating by the first Segment Routing node in response to said selection of the next SL Group, with said updating resulting in the Segments Left value identifying the position of said selected next SL Group in the Segment List of said sent particular Segment Routing packet and setting the IP Destination Address based on said a selected Segment Identifier in the next SL Group.

14. The method of claim 13, wherein the evaluation of the conditional expression is based on a first argument in the first SL Group.

15. The method of claim 14, wherein the first SL group includes a first Extended Value in addition to the first Segment Identifier; and wherein the first argument is partially or entirely stored in the first Extended value.

16. The method of claim 13, wherein the first SL Group is at a larger index position in the Segment List than the second SL Group; wherein the second SL Group is at a larger index position in the Segment List than the third SL Group; and wherein said selected next Segment Identifier is the third SL Group.

17. The method of claim 16, wherein each SL Group of the first, second, and third SL Groups has exactly one Segment.

18. The method of claim 13, wherein each SL Group of the first, second, and third SL Groups has exactly one Segment; and wherein the absolute value of the Segments Left value of said sent particular Segment Routing packet minus the Segments Left value of said received particular Segment Routing packet is at least two.

19. The method of claim 13, wherein the third SL Group is at a larger index position in the Segment List than the first SL Group; and wherein said selected next Segment Identifier is the third SL Group.

20. The method of claim 13, wherein the particular Segment Routing Header includes a particular type-length-value (TLV) containing data set by a Segment Routing node that is not the first Segment Routing node; and wherein the evaluation of the conditional expression is based on said data.

* * * * *

UNITED STATES PATENT AND TRADEMARK OFFICE
CERTIFICATE OF CORRECTION

PATENT NO. : 10,778,816 B2  
APPLICATION NO. : 16/019286  
DATED : September 15, 2020  
INVENTOR(S) : Filsfils et al.

Page 1 of 1

It is certified that error appears in the above-identified patent and that said Letters Patent is hereby corrected as shown below:

In the Claims

Column 14, Claim 1, Lines 45-46, "the first Segment Routing forwards" should read -- the first Segment Routing node forwards --

Signed and Sealed this
Eighth Day of March, 2022

Drew Hirshfeld
*Performing the Functions and Duties of the
Under Secretary of Commerce for Intellectual Property and
Director of the United States Patent and Trademark Office*